Sept. 20, 1971   L. T. ATWOOD ET AL   3,605,220
APPARATUS FOR CHANGING THE MESH SIZE OF NON-WOVEN NETTING
Filed July 10, 1967   2 Sheets-Sheet 1
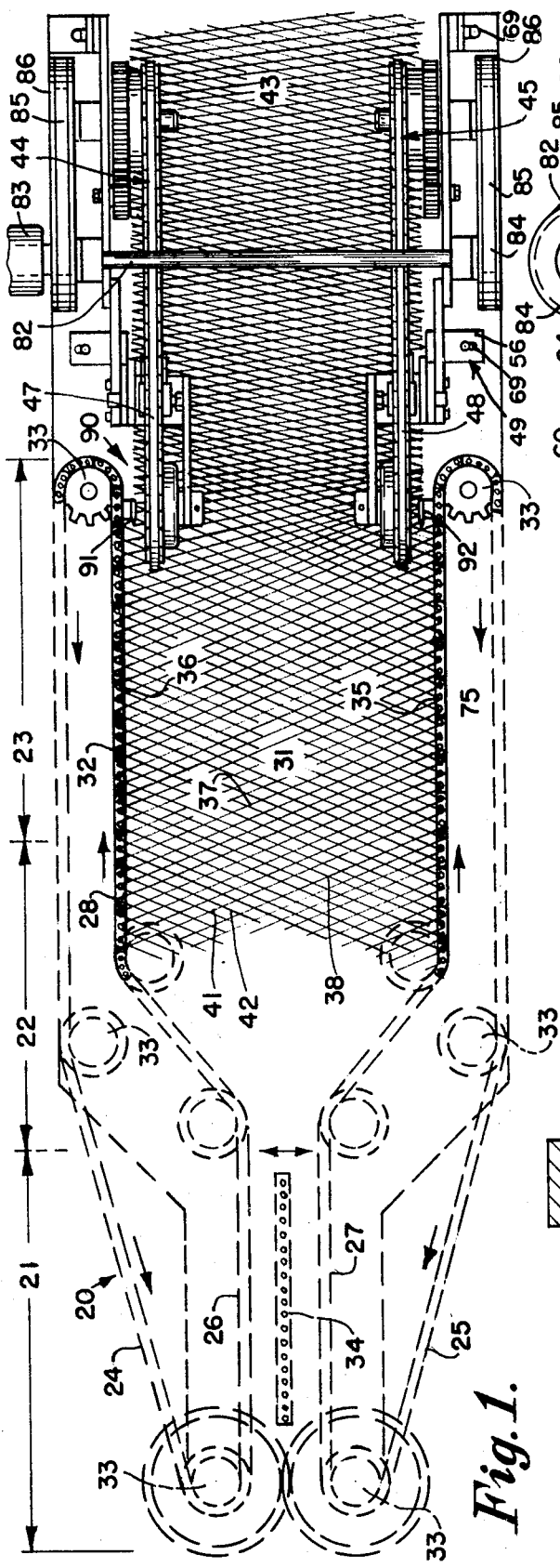
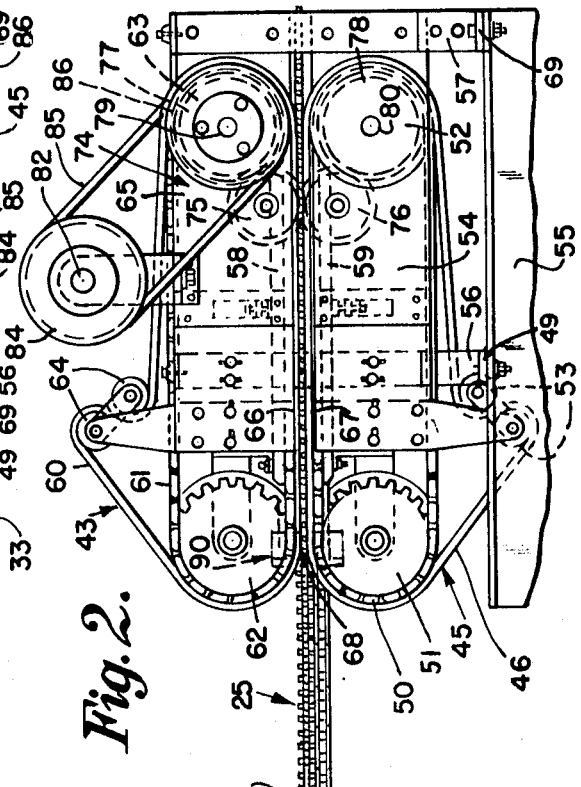
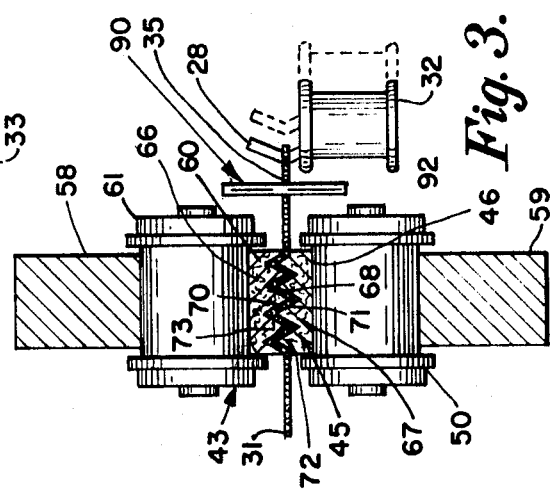
INVENTOR.
LAMAR T. ATWOOD
LESTER GIDGE
BY Pearson + Pearson
ATTORNEYS Sept. 20, 1971  L. T. ATWOOD ETAL  3,605,220
APPARATUS FOR CHANGING THE MESH SIZE OF NON-WOVEN NETTING
Filed July 10, 1967  2 Sheets-Sheet 2

INVENTOR.
LAMAR T. ATWOOD
LESTER GIDGE
BY Pearson + Pearson
ATTORNEYS

United States Patent Office 3,605,220
Patented Sept. 20, 1971

3,605,220
APPARATUS FOR CHANGING THE MESH SIZE OF NON-WOVEN NETTING
Lamar T. Atwood and Lester Gidge, Nashua, N.H., assignors to Union Carbide Corporation
Filed July 10, 1967, Ser. No. 652,337
Int. Cl. B32b 5/08, 31/00; D04b 3/10
U.S. Cl. 28—1
9 Claims

ABSTRACT OF THE DISCLOSURE

An apparatus and method for reducing the size of mesh in a non-woven, criss-cross, netting advancing along a path in a netting machine, the netting being carried by its selvedge loops on a pair of pin type carriers. A pair of endless transfer belts advance at a lesser speed than the netting, each positioned under one of the selvedge loop portions of the netting. The selvedge loop portions are either cut off the pin carrier and clamped against the transfer belts or lifted off the pins by elongated stripping fingers carried by the transfer belts, to advance therewith.

RELATED APPLICATIONS

In co-pending patent application, Ser. No. 349,931, filed Mar. 6, 1964, now U.S. Pat. 3,345,231, Oct. 3, 1967, owned by a common assignee, a machine for making non-woven, criss-cross strand netting is disclosed, the netting being formed on a pair of rows of pin-carrying chain links. Reduction of mesh size to a finer size is accomplished in this application by crowding the chain links in a portion of the stripping zone, the pins thus advancing while more closely spaced and the strands consequently being more closely spaced. This means is satisfactory for the purpose and has the advantage that the loops need not be stripped or cut from the pins but are retained under the control of the pins.

In co-pending patent application, Ser. No. 462,347, filed June 8, 1965 now U.S. Pat. No. 3,519,509, granted July 7, 1970, also owned by the said common assignee, another mesh reduction means is disclosed. In this application, a pair of endless members travelling at the same speed as the netting, clamp the selvedge of the netting in a nip and lift it off the pins. Each selvedge is then transferred to a second pair of endless members travelling at a lesser speed to reduce mesh size, and the netting is then delivered to a drum as a third transfer. This means is also satisfactory but involves multiple transfer grips, each taking place just inside the previous transfer grip so that the effective width of the netting is somewhat diminished.

BACKGROUND OF THE INVENTION

In the criss-cross netting apparatus of the prior art, it has been customary to form the netting in its ultimate width and to sandwich it between adhesive laminates while it is advancing. The strand intersections are thus locked to each other and the advance of the strands cannot be slowed to reduce the space therebetween and thereby reduce mesh size. The netting machine of the aforesaid patent application Ser. No. 349,931, forms the netting in a narrow width on advancing rows of pins, the rows are then diverged to draw the strand around the pins, while greatly increasing the width of the netting, and the size of the mesh of the final product is determined by the spacing of the pins in the rows. This spacing is close but it must be sufficient to permit a looper guide to pass between the pins. It is thus advantageous to be able to form netting at high speed on pins having adequate space therebetween to assure positive looping and to then be able to close up the strands of the netting after formation to make, for example, a product having no open mesh at all and closely resembling ordinary sheet fabric. Such a fine mesh product can then be sandwiched between laminates prior to stripping from the machine, the strand intersections can be adhered on the machine to form a unitary, strippable stucture, or the layers of criss-cross strands can be adhered to each other to also form a unitary, strippable, fine mesh fabric.

Applicants are not aware of any prior art, other than the aforesaid patent applications owned by the assignee of this application, which teaches means or methods for reducing the size of mesh of criss-cross netting after it has been formed and before it is stabilized by inter-connection of the strand layers or intersections.

SUMMARY OF THE INVENTION

In this invention, the selvedge loop portions of the non-woven, criss-cross strand netting are each transferred to an endless tranfer member travelling at a reduced speed just inside and under one of the advancing rows of pins in the stripping zone of the machine. In one embodiment, the selvedge loop portions are cut off the pins while being simultaneously clamped and crimped against the transfer member, thus avoiding multiple transfers and avoiding frictional resistance in lifting the loops off the pins. The severed loop portions, however, result in a slight loss of effective width of netting but no more perhaps than the equivalent loss when the loop portions are frictionally gripped and snubbed. In the other embodiment, the endless transfer member is provided with elongated fingers, the tips of which travel at netting speed around an end stretch to enter and lift the loops off the pins and then slow down to the lesser speed of the transfer member on a straight stretch to reduce mesh size. No loss of effective width of netting occurs with this embodiment, since the fingers take the place of the pins and no loop severing or loop gripping is required.

In the drawing:

FIG. 1 is a diagrammatic plan view of a typical machine for making non-woven, criss-cross strand netting, showing a preferred embodiment of the mesh reduction apparatus of this invention in the stripping zone of the machine;

FIG. 2 is a fragmentary side elevation of the mesh reduction apparatus shown in FIG. 1;

FIG. 3 is an enlarged, fragmentary end elevation in section showing the mating surfaces of the transfer means gripping a severed selvedge loop portion of the netting;

Figure 4:
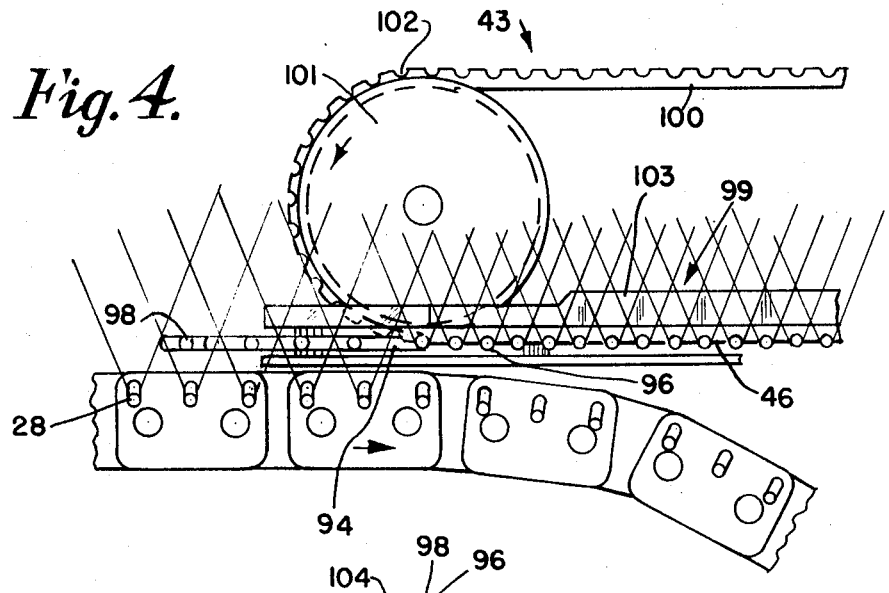
FIG. 4 is an enlarged fragmentary plan view showing the finger type embodiment of the invention.

In FIG. 1, a netting machine 20, of a commercially available type is shown, this being sold under the name "Scrimaster" by Union Carbide Corporation of New York, N.Y., and being described in detail in the aforesaid application Ser. No. 349,931. Machine 20 includes a looping zone 21, a spreading zone 22, and a stripping zone 23, and a pair of laterally spaced chains 24 and 25 have stretches 26 and 27 which advance along a path through the said zones at a predetermined speed. Spaced pins 28 support the non-woven, criss-cross strand netting 31 on the chain links 32, there usually being about three pins on each link. Chains 24 and 25 are trained around sprockets 33 rotatable in a horizontal plane on vertical axes and there is a looping member 34 in the looping zone 21 for forming the netting with short, rapid strokes on the narrowly spaced stretches in that zone.

The selvedge loop portions 35 and 36, on each opposite side of the full width netting 31, in the stripping zone 23, thus are supported on, and between, the pins 28 of each laterally spaced, longitudinally extending stretch 26 and 27. The meshes 37 of netting 31 are of predetermined size, or area, depending on the longitudinal spacing of the pins 28 and the crossing points, or intersections, 38, of the upper layer of strands 41 and the lower layer of strands 42 are not adhered to each other.

The mesh reduction means 43 of the invention in the preferred embodiment of FIGS. 1–3 includes a pair of endless transfer means 44 and 45, each having at least some portion, such as 47 and 48, just inside the path of one of the rows of pins 28 and under the path of one of the selvedge loop portions 35 or 36. Preferably each transfer means 44 and 45 is a lower belt 46 overlying a chain 50 trained around a forward sprocket 51 and a rearward sprocket 52, the belt 46 passing around the tension pulley mechanism 53, all of the sprockets or end pulleys being rotatable in suitable bearings on a sub-frame 54 detachably affixed to the main frame 55 of machine 20 by supports 56 and 57. Each transfer means also includes an endless upper belt 60, overlying an upper chain 61 trained around sprockets 62 and 63, and having tension pulleys 64, all carried by a sub-frame 65 mounted on supports 56 and 57 and substantially identical with the lower assembly. The upper belt 60 and lower belt 46 on each side of the netting thus have adjacent longitudnial stretches 66 and 67 extending along the path of the netting and forming an elongated nip 68 for frictionally gripping and supporting one of the selvedges thereof 35 or 36. Backer plates 58 and 59 engage the links of the chain stretches to create a pressure nip.

Each endless transfer means includes mechanism 49 for diverging each transfer means from the other, to compensate for sag, mechanism 49 being located in rear of the entrance of nip 68 which receives the netting. Mechanism 49 comprises the bolt and elongated slot mounting 69 of supports 56 and 57 which permit a slight convergence or divergence as required (FIG. 1).

As best show in FIG. 3, the meeting surfaces 70 and 71 of the stretches 66 and 67 each are provided with a series of longitudinally-extending, angular, V-shaped ridges 72 and channels 73, the ridges of one flexible belt being received in the channels of the other flexible belt to frictionally clamp, crimp and snub the selvedge edge portion gripped in the nip 68 and support the netting while preventing sag thereof.

Means 74 is provided for advancing the stretches 66 and 67 of the transfer means 44 and 45 at a predetermined speed less than the speed of advance of the pins 28 to reduce the mesh to a finer size while causing the obliqued strands of the netting to individually and successively close up the space between strands. Means 74 includes the intermeshed connecting gears 75 and 76 which drive the lower sprocket 52 at the same speed as the upper sprocket 63 but in the opposite direction through gears 77 and 78 and sprocket shafts 79 and 80. A set of such gears 75, 76, 77 and 78 are provided on the opposite pair of upper and lower belt transfer devices. A drive shaft 82, driven by a suitable electric motor, variable-speed, device 83, or driven by variable speed connection to the drive of machine 20, extends across the machine 20 and drives a timing belt pulley such as 84 at each opposite end of the shaft 82, timing belts such as 85 and a second pulley 86 on the shaft 79 of the sprockets 63 to power means 43 at the desired speed.

Loop stripping means 90 is provided in the form of a pair of strand cutters 91 and 92, each located along the path of the selvedge edge portions 35 and 36 at the entrance of the nip 68, preferably about one-half inch in rear of the axes of the forward sprockets 51 and 62, which create the nip throat. Referring to FIG. 1, it will be seen that as each successive individual strand enters the slower moving nip on one side of the netting, its loop is cut off its pin while its selvedge loop portion commences to slow its advance. The other end of the strand, on the opposite row of pins, continues to advance at the speed of the pins, thereby changing the angle of the criss-cross strands while moving the strands progressively closer to each other to form a finer mesh. A slight divergence of the transfer belts compensates for any resultant sag and by the time both opposite ends of the strands are clamped in the nip 68, the desired fine mesh has been accomplished, or, if desired, the mesh has been completely eliminated and a sheet-like web produced.

It will be understood that the full width netting 31 may be of relatively heavy strand material and may be ninety-six or more inches in width, so that it exerts considerable tension on the belts faces 70 and 71. However, the rigid backer plates 58 and 59 prevent the chain links from yielding inwardly, the links prevent the belts from yielding inwardly, and the serrated or angularly ridged faces 70 and 71 prevent the netting from slipping out of the grip of the means 43.

Figure 5:
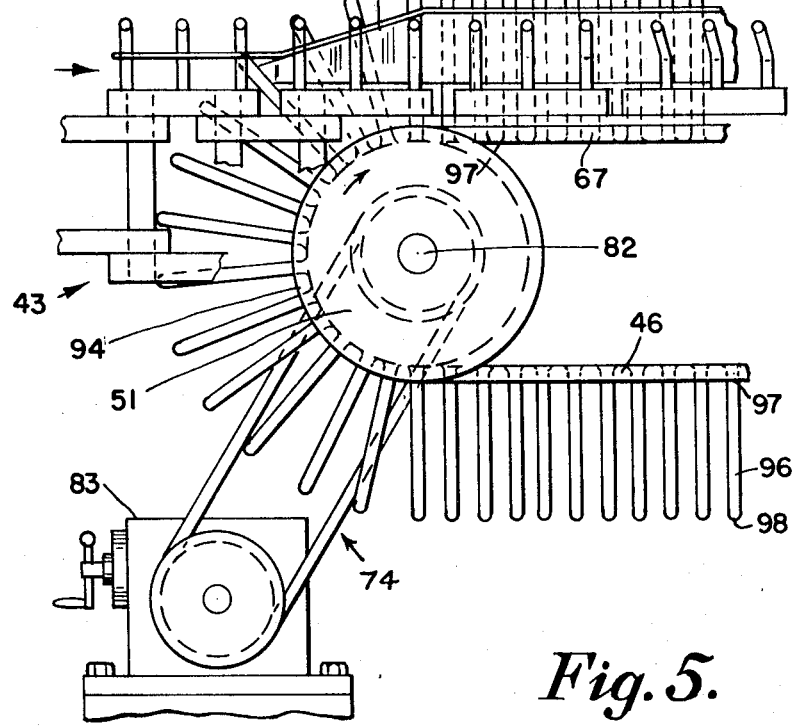
FIG. 5 is a side elevation of the device shown in FIG. 4.

The embodiment of the invention shown in FIGS. 4 and 5 does not call for severing the loops to strip them from the pins and therefore retains the full effective width of the netting 31 as well as retaining a looped selvedge. The mesh reduction means 43 of this embodiment includes the endless transfer means 44 and 45 in the form of a flexible lower belt 46 on each side of the machine 20 just inside and under one of the advancing rows of pins 28. The belt 46 includes the end stretch 94, extending around the forward sprocket, or sheave, 51, and the straight stretch 67, the surface speed of the stretch 67 being less than the predetermined speed of the pins 28 and the belts 46 on each side being driven by means 74. Means 74 includes a suitable cross shaft 82 to which the forward sprockets 51 are fast and driven by connection to the drive of machine 20 or by a separate variable-speed drive 83.

The transfer means and loop stripping means of this embodiment are combined in the form of a plurality of elongated fingers 96, each of which is preferably of self-supporting material, such as rubber, metal, plastic, or the like, and about twice the height of the pins 28 while being of small diameter, such as one-sixteenth of an inch. If, for example, the pins 28 are spaced longitudinally three to the inch, the fingers 96 may be spaced longitudinally six to the inch to halve the mesh size, and the base 97 of each finger is secured to the endless flexible belt 46 either in longitudinal alignment, or, if closer spacing is desired, the bases 97 of the fingers can be staggered so long as there is space around each finger-tip 98 to receive a loop of the strand being used.

As shown in FIG. 5, advantage is taken of the fact that the free terminal tips 98 of the fingers 96, travel at greater speed in rounding the curved end stretch 94, this greater speed being predetermined to be equal to the speed of advance of the pins 28. Thus the tips 98 individually and successively enter the individual and successive selvedge loop portions 35 and 36, from beneath as they round end stretch 94, lifting off the selvedge loops from the pins 28, first at the speed of the pins and then progressively slowing down to the lesser speed of the straight stretch 67. Along the straight stretch 67, the fingers are advanced in normal close-spaced relation while supporting the netting while the pins 28 travel back to the looping zone.

Preferably backer means 99 is provided for each row of fingers 6, a similar to backing plates 58 and 59, the means 99 including an endless belt 100 trained around horizontally rotatable sheaves 101 and having spaced semi-circular recesses 102 for receiving the fingers 96. The belt 100 is backed by a backer plate 103 to prevent the elongated fingers 96 from yielding inwardly and the belt 100 can be driven or free travelling as desired. Backer plate 103 preferably includes an inclined cam face 104 for engaging the selvedge loop portions 35 or 36 to assist the fingers 96 in lifting off the loops from pins 28.

The mesh reduction means of this invention may be immediately in rear of the spreading zone, or anywhere in the stripping zone for moving the finer mesh netting into laminating or intersection cementing position on the machine 20, or onto a succeeding treatment machine.

It is within the scope of this invention, that the mesh reduction apparatus and method, disclosed herein, can be operated, if desired, to increase the size of the mesh delivered at the end of the spreading zone, such large size mesh being useful as a laminate sandwiched in certain products. To increase mesh size the mesh reduction means 43 is mounted at the end of the spreading zone, so that additional strand material may be drawn off the packages through the looping mechanism, and the variable speed device 83 is arranged to advance the transfer means 44 and 45 at a speed greater than the speed of the pin carrying chains 24 and 25.

What is claimed is:

1. In a netting machine of the type having a pair of laterally-spaced, longitudinally-extending, substantially parallel rows of loop-receiving pins advancing along a path at a predetermined speed and supporting therebetween, by selvedge loops on said pins, a non-woven, crisscross, open mesh netting of predetermined mesh size, the combination of mesh reduction means comprising
   a pair of laterally-spaced, longitudinally-extending, endless transfer belt means, each having opposed upper and lower belt stretches thereof located just inside one of said rows of pins and extending along said path generally in the direction of advance of said netting for receiving and supporting said netting by gripping the selvedges thereof and each including backer plate means for forming said stretches into elongated pressure nips;
   a pair of loop stripping means, each located along said path, at one of the said elongated pressure nips of said endless belt transfer means, for removing the selvedge loops of said netting from said pins after said netting has been received in said pressure nips of said transfer means;
   and variable speed drive means for advancing said belts of said endless transfer means along said path at a speed less than the predetermined speed of said pins for reducing the size of said mesh to less than said predetermined size.

2. A combination as specified in claim 1 wherein:
   each said endless transfer means includes an endless chain backing up said endless belts and backed up by said backer plate means to form said pressure nips and prevent inward sag of said network, and
   said loop stripping means is a pair of cutters, each located just in rear of the entrance throat of one said elongated pressure nip, and adapted to sever each individual and successive loop of said advancing netting after the strands from which said loops are severed are engaged in said nip.

3. A combination as specified in claim 1 wherein:
   each said belt includes a series of longitudinally extending, V-shaped ridges and grooves, the ridges on one said belt closely fitting the grooves of the other said belt to clamp, snub and crimp the selvedge of said netting while said netting is advanced in said nip, and each said belt means includes a roller chain backing up each belt and backed up by said backer plate means.

4. A combination as specified in claim 1 wherein:
   said endless transfer means includes mechanism for diverging each said means slightly from the path of said pins in rear of said elongated pressure nips receiving said netting for keeping said netting taut and avoiding sag therein.

5. In combination with a netting machine of the type having an unadhered network of obliqued, criss-cross strands defining a mesh of predetermined size, supported between a pair of pin chains by the selvedge loops thereof and advancing along a path at a predetermined speed,
   two pairs of opposed upper and lower endless belt means along said path, each pair of just inside one said pin chain, and each having an elongated belt nip adapted to receive the adjacent selvedge loop portion of said network, clamp the same between said belts and support said network along said path;
   a pair of strand cutters, each mounted along said path, in rear of the entrance of said nip to cut said selvedge loops to release the same from said pins after said loop portions have been clamped in said elongated pressure nip;
   and drive means for advancing said belt means at a predetermined speed different from the speed of said pin chain to increase or decrease the size of said mesh.
   whereby the relative rates of advance of said belt means and said pin chains determines the size of said mesh and the angular relationship of said strands.

6. A combination as specified in claim 5 wherein:
   each said belt means includes an upper and lower endless belt having mating stretches extending along said path to form said enlongated nip, a pair of roller chains each backing up one of said stretches and a pair of elongated, rigid backer plates each backing up one of said roller chains to convert said elongated nip an elongated pressure nip adapted to retain said network against sag.

7. A combination as specified in claim 5 wherein:
   each said belt includes a series of longitudinally extending angular shaped V-ridges and V-shaped channels which fit corresponding ridges and channels in the opposite belt to clamp, snub and crimp said network while it is advancing along said elongated pressure nip.

8. Apparatus for changing the size of the mesh in unconnected netting formed of obliqued criss-cross strands after it has been formed on a pair of advancing pin chains and before it has been stabilized into an integral product said apparatus comprising:
   a pair of transfer means, each mounted alongside one of said pin chains to engage and nip the adjacent selvedge portion of said advancing netting at the leading ends of said obliqued strands while the trailing ends thereof, on the opposite selvedge, are still free of such nip engagement,
   means operably associated with said transfer means for disengaging the selvedge loops of said network from said pin chains after said loops have been engaged by said transfer means,
   and variable speed drive means for advancing said transfer means at a speed different from the speed of said pin chains to thereby change the size of said mesh.

9. Apparatus as specified in claim 8 plus:
   mechanism mounting said transfer means to advance at a selected, predetermined direction relative to said pin chains, whereby said transfer means may be diverged slightly therefrom to take up any slack in said network caused by angular displacement of said strands to reduce mesh size or may converge relative thereto when mesh size is increased.

References Cited

UNITED STATES PATENTS 2,147,115  2/1939  Williams, Jr. _____ 26—61B
2,962,080  11/1960  Hirsch _____ 156—440

(Other references on following page)

References Cited

UNITED STATES PATENTS

| | | | |
|---|---|---|---|
| 3,000,432 | 9/1961 | Olken | 156—181 |
| 3,137,746 | 6/1964 | Seymour et al. | 264—Net |
| 3,156,027 | 11/1964 | Wellman | 28—1CL |
| 3,237,316 | 3/1966 | Sachs | 26—61(B)(UX) |
| 3,390,439 | 7/1968 | Kalwaites | 28—1CL |
| 3,345,231 | 10/1967 | Gidge et al. | 156—181 |
| 3,345,232 | 10/1967 | Gidge et al. | 156—181 |
| 3,490,976 | 1/1970 | Gidge | 156—181X |
| 3,519,509 | 7/1970 | Gidge et al. | 156—181 |

FOREIGN PATENTS

| | | | |
|---|---|---|---|
| 1,432,857 | 2/1966 | France | 156—181 |

ROBERT R. MACKEY, Primary Examiner

U.S. Cl. X.R.

156—440

UNITED STATES PATENT OFFICE
CERTIFICATE OF CORRECTION

Patent No. 3,605,220      Dated September 20, 1971

Inventor(s) Lamar T. Atwood and Lester Gidge

It is certified that error appears in the above-identified patent and that said Letters Patent are hereby corrected as shown below:

Column 4, line 74, insert "9" after "fingers" and before "6".

Column 6, line 11, insert "mounted" before "along".

Column 6, line 11, delete "of".

Column 6, line 35, insert "into" after "nip" and before "an".

Signed and sealed this 18th day of July 1972.

(SEAL)
Attest:

EDWARD M. FLETCHER, JR.      ROBERT GOTTSCHALK
Attesting Officer      Commissioner of Patents